United States Patent
Jung et al.

(10) Patent No.: US 9,465,371 B2
(45) Date of Patent: Oct. 11, 2016

(54) BUILDING AUTOMATION AND CONTROL SYSTEM AND METHOD FOR OPERATING THE SAME

(71) Applicant: LG ELECTRONICS INC., Seoul (KR)

(72) Inventors: Eunhwa Jung, Seoul (KR); Jaesik Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 641 days.

(21) Appl. No.: 13/772,688

(22) Filed: Feb. 21, 2013

(65) Prior Publication Data

US 2013/0218347 A1    Aug. 22, 2013

(30) Foreign Application Priority Data

Feb. 22, 2012    (KR) .................. 10-2012-0018185

(51) Int. Cl.
| | | |
|---|---|---|
| *G06F 19/00* | (2011.01) | |
| *G05B 11/01* | (2006.01) | |
| *G06Q 10/10* | (2012.01) | |
| *G06Q 30/02* | (2012.01) | |

(52) U.S. Cl.
CPC ............. *G05B 11/01* (2013.01); *G06Q 10/10* (2013.01); *G06Q 30/02* (2013.01)

(58) Field of Classification Search
USPC ............... 700/275, 276, 278, 295; 709/206; 455/39
See application file for complete search history.

(56) References Cited

U.S. PATENT DOCUMENTS

| | | | | |
|---|---|---|---|---|
| 5,572,438 A * | 11/1996 | Ehlers | ................. | G01R 21/133 307/37 |
| 5,774,668 A * | 6/1998 | Choquier | ................. | G06F 9/505 370/480 |
| 5,916,306 A * | 6/1999 | Ruiz | ................. | H04L 45/02 709/242 |
| 6,085,238 A * | 7/2000 | Yuasa | ................. | H04L 12/4641 370/409 |
| 6,192,282 B1 * | 2/2001 | Smith | ................. | G05B 15/02 340/12.53 |
| 6,690,304 B1 | 2/2004 | Shirokura et al. | | |
| 8,255,387 B2 * | 8/2012 | Galindo-Legaria | ............. | G06F 17/30321 707/713 |
| 8,849,461 B2 * | 9/2014 | Ersavas | ................. | A01G 1/00 700/275 |
| 2002/0152298 A1 * | 10/2002 | Kikta | ................. | H04L 12/2803 709/223 |
| 2003/0088524 A1 * | 5/2003 | Bibelhausen | ...... | G06Q 30/0283 705/400 |

(Continued)

FOREIGN PATENT DOCUMENTS

| | | |
|---|---|---|
| CN | 1340943 A | 3/2002 |
| CN | 1673637 A | 9/2005 |

(Continued)

OTHER PUBLICATIONS

European Patent Office: "Notice from the European Patent Office dated Oct. 1, 2007 concerning business methods"; Official Journal EPO; pp. 592-593 (XP-007905525).

(Continued)

*Primary Examiner* — Kidest Bahta
(74) *Attorney, Agent, or Firm* — Ked & Associates LLP (57) ABSTRACT

There is disclosed herein a building automation and control system and a method for operating the same. According to the embodiments of the present disclosure, a building controller may process data using a plurality of protocols without using a BACnet gateway, thereby controlling devices in a building coexisting with two or more protocols. According to the embodiments of the present disclosure, sub-systems having different their own protocols, respectively, may be integrated to establish a building automation and control system, and data may be processed using a single building controller, thereby enhancing the scalability and stability of the system.

12 Claims, 3 Drawing Sheets

(56) References Cited

U.S. PATENT DOCUMENTS

| | | | |
|---|---|---|---|
| 2008/0076450 A1* | 3/2008 | Nanda | G01D 21/00 455/456.1 |
| 2009/0307255 A1* | 12/2009 | Park | G06Q 10/10 |
| 2010/0063862 A1* | 3/2010 | Thompson | G06Q 30/02 705/7.29 |
| 2010/0138066 A1* | 6/2010 | Kong | G06Q 30/018 700/295 |
| 2010/0281387 A1* | 11/2010 | Holland | G05B 15/02 715/735 |
| 2013/0227569 A1* | 8/2013 | Kohli | G06F 9/455 718/1 |
| 2014/0359552 A1* | 12/2014 | Misra | H04L 67/12 717/100 |

FOREIGN PATENT DOCUMENTS

| | | |
|---|---|---|
| CN | 1834545 A | 9/2006 |
| JP | 2008-176767 A | 7/2008 |
| KR | 2008-0068232 A | 7/2008 |

OTHER PUBLICATIONS

European Search Report dated May 23, 2013 issued in Application No. 13 15 6005.

Chinese Office Action issued in Application No. 201310055435.1 dated Feb. 2, 2015.

* cited by examiner

BUILDING AUTOMATION AND CONTROL SYSTEM AND METHOD FOR OPERATING THE SAME

CROSS-REFERENCE TO RELATED APPLICATIONS

The present disclosure relates to subject matter contained in priority Korean Application No. 10-2012-0018185, filed on Feb. 22, 2012, which is herein expressly incorporated by reference in its entirety.

BACKGROUND OF THE INVENTION

1. Field of the Invention

The present disclosure relates to a building automation and control system for integrating a plurality of protocols to control a building and a method for operating the same.

2. Description of the Related Art

In recent years, it has been required a change to intelligent buildings (IBs) capable of maximizing intellectual productivity and maintaining a pleasant office environment. A building automation and control system for automating the intelligent building may require real-time monitoring and control.

In recent years, the building automation and control system may provide various functions such as heating and cooling, ventilation, lighting, disaster prevention, security, access control, and the like, using mainly a building automation and control network (BACnet) which is one of open protocols. The BACnet is an open communication protocol for building automation adopted by the American ANSI/ASHRAE standard. The present BACnet is an American and European standard, and was domestically established as an industrial standard at the end of 1999. The BACnet can support various communication media, and provide a lot of flexibility in constructing a system. Furthermore, the BACnet defines a standardized object by introducing an object-oriented concept in order to provide the flexibility of such a system.

On the other hand, companies who possess each subsystem have difficulty in completely changing their own protocol. Due to this, there coexist a BACnet protocol and a heterogeneous communication protocol, and thus in case of a system that does not support a BACnet protocol, a BACnet gateway may be required to perform communication with a network controller. The BACnet gateway performs the role of protocol conversion and routing between a non-BACnet controller and a BACnet controller, thereby allowing two controllers and facilities or devices connected to the controllers to be linked to one another.

SUMMARY OF THE INVENTION

An object according to the embodiments of the present disclosure is to provide a building automation and control system and a method of operating the same capable of controlling devices in a building in which there coexist two or more communication protocols without using a BACnet gateway.

In a building automation and control system for automating and controlling a building configured with one or more sub-nets, the building automation and control system according to an embodiment may include a building controller configured to control devices installed in a building to form the sub-net, a first device connected to the building controller using a first protocol to transmit and receive first data, and a second device connected to the building controller using a second protocol to transmit and receive second data, wherein the building controller includes a first module for processing the first data using the first protocol, and converting and processing the second data into the data of the first protocol, a second module for processing the second data using the second protocol, and converting and processing the first data into the data of the second protocol.

In a building automation and control system according to an embodiment, the building automation and control system according to another embodiment may further include a first central control server connected to the building controller using the first protocol to control a sub-net installed with the first device based on the first data, and a second central control server connected thereto using the second protocol to control a sub-net installed with the second device based on the second data.

According to the embodiments, the first module may include a first server communication unit configured to transmit and receive the first data to and from the first central control server, a first data conversion unit configured to convert the first data into the data of the second protocol, and a first device communication unit configured to transmit and receive the first data to and from the first device.

Furthermore, the second module may include a second server communication unit configured to transmit and receive the second data to and from the second central control server, a second data conversion unit configured to convert the second data into the data of the first protocol, and a second device communication unit configured to transmit and receive the second data to and from the second device.

A method of operating a building automation and control system according to an embodiment may include a building controller connected to devices within a building configured with a plurality of sub-nets using different protocols, respectively, to transmit and receive data and control devices forming the sub-net based on the data, and configured to automate and control the building using the building controller, and the method may include a data receiving step of receiving the data from the device, a first determination step of determining whether or not the data is first protocol data, a second determination step of determining whether or not the destination of the data uses the first protocol, and a data transmission step of transmitting the data to the destination according to a determination result of the first and the second determination step.

A method of operating a building automation and control system according to another embodiment may include a building controller connected to devices within a building configured with a plurality of sub-nets using different protocols, respectively, to transmit and receive data and control devices forming the sub-net based on the data and a central control server connected to the building controller, and configured to automate and control the building using the building controller, and the method may include a data receiving step of receiving the data from the central control server, a first determination step of determining whether or not the data is first protocol data, a second determination step of determining a protocol of the relevant device subject to the data, a data transmission step of transmitting the data to the relevant device according to a determination result of the first and second determination step, a step of receiving response data from the relevant device, a third determination step of determining a protocol of the central control server, and a response data transmission step of transmitting the response data to the central control server according to a determination result of the third determination step.

According to the embodiments of the present disclosure, a building controller may process data using a plurality of protocols without using a BACnet gateway, thereby controlling devices in a building coexisting with two or more protocols.

According to the embodiments of the present disclosure, sub-systems having different their own protocols, respectively, may be integrated to establish a building automation and control system, and data may be processed using a single building controller, thereby enhancing the scalability and stability of the system.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
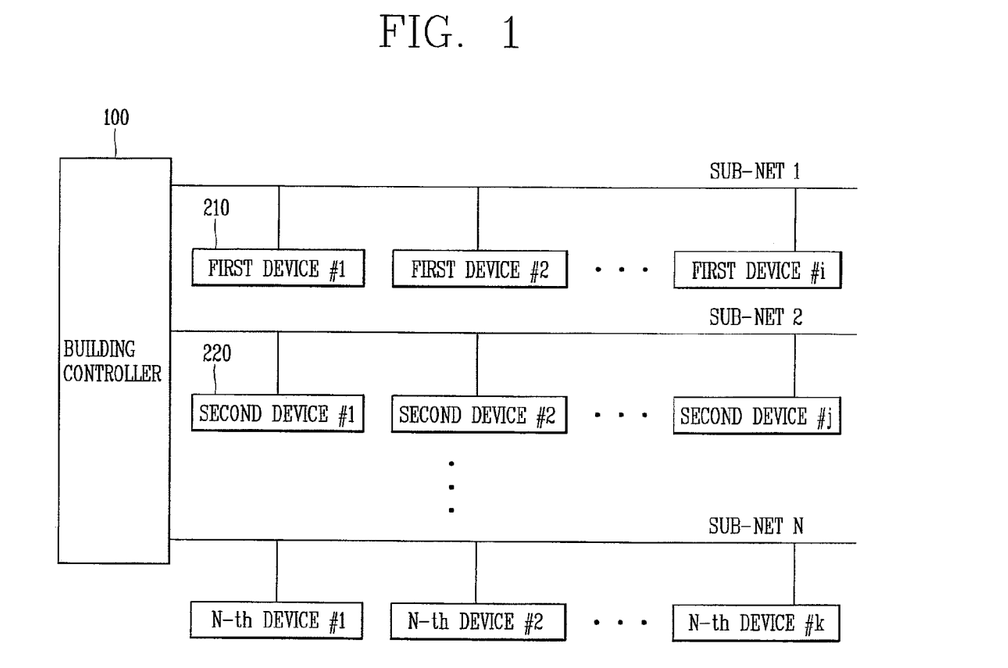
FIG. 1 is a block diagram schematically illustrating the configuration of a building automation and control system according to an embodiment.

Referring to FIG. 1, in a building automation and control system for automating and controlling a building configured with one or more sub-nets, the building automation and control system according to an embodiment may include a building controller 100 configured to control devices installed in a building to form the sub-net, a first device 210 connected to the building controller using a first protocol to transmit and receive first data, and a second device 220 connected to the building controller using a second protocol to transmit and receive second data.

Here, the building controller 100 may include a first module 110 for processing the first data using the first protocol, and converting and processing the second data into the data of the first protocol, and a second module 120 for processing the second data using the second protocol, and converting and processing the first data into the data of the second protocol.

The data may include all of operation information, status information, message, response, and the like. The first protocol may be a BACnet protocol, and the second protocol may be one of transmission control protocol (TCP), user datagram protocol (UDP), serial, and parallel, or one of open communication protocols excluding the BACnet. As an open communication protocol, the BACnet protocol has a structure having only four layers of the seven layer OSI, and the only required function is used as a function of the lower layer, and a significant portion of the OSI function is remained in the application layer. The detailed description of the BACnet protocol or other protocols will be omitted.

The sub-net may be formed in one or more sub-system including air conditioning such as heating and cooling, ventilation and the like, lighting, disaster prevention, security, and access control. Devices connected to the sub-net may include the foregoing first devices and second devices. Devices constituting each sub-system may be divided into facilities and equipment. The facility is the sub-system itself or a large scale of device for dividing the sub-system into two or more and the equipment is a small scale of device constituting the facilities.

The facility refers to a heating and cooling device (air conditioner), an air handling unit, a fan, a boiler, a cooling tower, a pump, a freezer, a lighting device, a power device, a fire device, a disaster prevention device, a security device, an access control device, and the like, for example. In case where the air conditioner is a facility, the equipment denotes a compressor, a fan, a temperature sensor and the like, for example. Building automation and control is carried out based on a supervisory point for one control or monitoring which is so called a monitoring and control point. A building automation and control system configures one or more monitoring and control points for devices, namely, facilities or equipment, and performs monitoring, control and the like for the device through a value of the relevant monitoring and control point. As a monitoring or control item used in a facility or equipment, for example, the monitoring and control point refers to control, monitor, error, and the like.

The building controller 100 may be a microcomputer for recording and storing all the related information such as control outputs and status changes of the devices in a building which are connected to the sub-net, and controlling and monitoring the devices according to an operational logic within a monitoring and control program. The building controller 100 directly controls the input and output signals of the devices 210, 220 using monitoring and control at each monitoring and control point for the facilities and equipment of the sub-system provided in a building, and its own built-in function.

Upon receiving data from devices, the building controller 100 determines which protocol is used by a device that has transmitted the relevant data and which protocol is used by a device that will transmit the relevant data. In other words, the building controller determines whether data that has been received from the device is first protocol data or second protocol data. Of course, the building controller can recognize whether it is data transmitted from the first device or data transmitted from the second device based on the connection status, and thus immediately determine which protocol is used therein. For example, the first module 110 receives the data of the first device 210 and the second module 120 receives the data of the second device 220, respectively. Then, the building controller determines which protocol is used by the destination of the relevant data.

For example, it will be described as follows. In other words, when the data received by the building controller is the first protocol data, and the destination uses the first protocol, the building controller transmits the data to the destination without protocol conversion. When the received data is the first protocol data, and the destination uses the second protocol, the building controller converts the data into second protocol data and transmits the converted second protocol data to the destination. On the contrary, when the received data is the second protocol data, and the destination uses the first protocol, the building controller converts the data into first protocol data and transmits the converted first protocol data to the destination. When the received data is the second protocol data, and the destination uses the second protocol, the building controller transmits the data to the destination without protocol conversion. The building controller may receive the data as the need arises, and then process the received data and then transmit the processed data to the destination. Here, the destination may be devices in another sub-net, or a central control server connected to the building controller.

Figure 2:
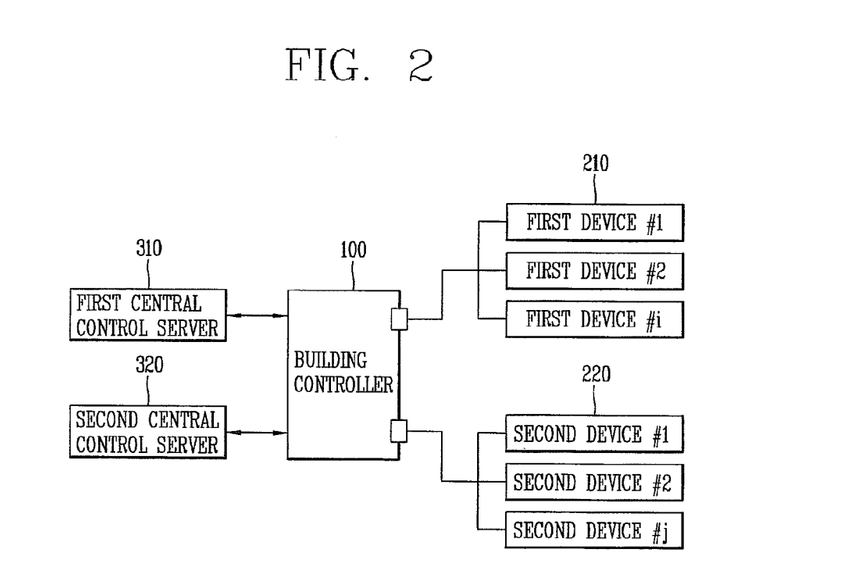
FIG. 2 is a block diagram schematically illustrating the configuration of a building automation and control system according to another embodiment.

Referring to FIG. 2, in a building automation and control system for automating and controlling a building configured with one or more sub-nets, the building automation and control system according to another embodiment may include a building controller 100 configured to control devices installed in a building to form the sub-net, a first device 210 connected to the building controller using a first protocol to transmit and receive first data, and a second device 220 connected to the building controller using a second protocol to transmit and receive second data, a first central control server 310 connected to the building controller 100 using the first protocol to control a sub-net installed with the first device based on the first data, and a second central control server 320 connected thereto using the second protocol to control a sub-net installed with the second device based on the second data. Here, the building controller 100 may include a first module 110 and a second module 120 as illustrated in one embodiment. Furthermore, the first central control server 310 and second central control server 320 may be configured with separate equipment, but may be also configured in the form of two modules within one equipment.

The first protocol may be a BACnet protocol. The second protocol may be one of TCP, UDP, serial, and parallel, or one of open communication protocols excluding the BACnet. The sub-net may be formed in one or more sub-system including air conditioning such as heating and cooling, ventilation and the like, lighting, disaster prevention, security, and access control. Their redundant description disclosed in the foregoing embodiment will be omitted and substituted by the earlier description.

Upon receiving data from a central control server or devices, the building controller 100 determines which protocol is used by a device that has transmitted the relevant data and which protocol is used by a device that will transmit the relevant data. In other words, the building controller determines whether data that has been received from the central control server or device is first protocol data or second protocol data. Of course, the building controller can recognize whether it is data transmitted from the first device or data transmitted from the second device based on the connection status, and thus immediately determine which protocol is used therein. Furthermore, the building controller may recognize whether it is data transmitted from the first central control server or data transmitted from the second central control server based on the connection status, and thus immediately determine which protocol is used therein. For example, the first module 110 receives the data of the first central control server 310 and the second module 120 receives the data of the second central control server 320, respectively. Then, the building controller determines which protocol is used by the destination of the relevant data. Here, the data transmitted by the central control server may further include various commands, and the data transmitted by the device may further include response data.

For example, it will be described as follows. In other words, when the data received by the building controller from the central control server, namely, command, is the first protocol data, and a device corresponding to the destination uses a first device using the first protocol, the building controller transmits the data to the first device without protocol conversion. When the received command is the first protocol data transmitted by the first central control server, and the relevant device uses the second protocol as a second device, the building controller converts the data into second protocol data and transmits the converted second protocol data to the second device. On the contrary, when the received command is the second protocol data transmitted by the second central control server, and the destination is a first device using the first protocol, the building controller converts the data into first protocol data and transmits the converted first protocol data to the first device. When the received data is the second protocol data, and the destination is a second device using the second protocol, the building controller transmits the data to the second device without protocol conversion. The building controller may receive the command as the need arises, and then process the received data and then transmit the processed data to the relevant device. On the contrary, the building controller may receive response data to the relevant command from the relevant devices, and perform protocol conversion or transmit the data as it is to the central control server.

Figure 3:
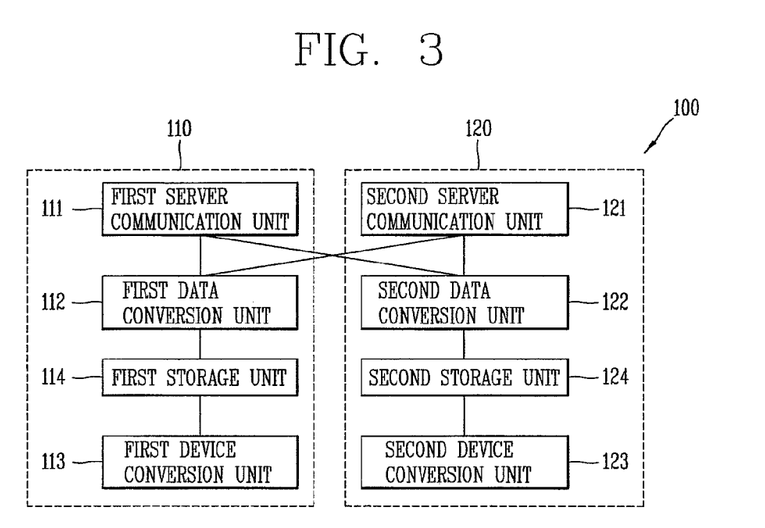
FIG. 3 is a block diagram schematically illustrating the configuration of a building controller according to an embodiment.

Referring to FIG. 3, the first module 110 may include a first server communication unit 111 configured to transmit and receive the first data to and from the first central control server 310, a first data conversion unit 112 configured to convert the first data into the data of the second protocol, and a first device communication unit 113 configured to transmit and receive the first data to and from the first device 210. The first server communication unit may be omitted in a system according to an embodiment.

The first module 110 may further include a first storage unit 114 configured to store the monitoring and control points of devices forming the sub-net connected to the first devices into a database.

Furthermore, the second module 120 may include a second server communication unit 121 configured to transmit and receive the second data to and from the second central control server 320, a second data conversion unit 122 configured to convert the second data into the data of the first protocol, and a second device communication unit 123 configured to transmit and receive the second data to and from the second device 220. The second server communication unit may be omitted in a system according to an embodiment.

The second module 120 may further include a second storage unit 124 configured to store the monitoring and control points of devices forming the sub-net connected to the second devices into a database.

The first server communication unit 111 receives first data, for example, a control command, from the first central control server 310. The first data conversion unit 112 determines whether the destination of the control command is a first device or second device, and converts it into the data of the second protocol when the destination is a second device. The first device communication unit 113 transmits a control command to the first device. The second device communication unit 123 transmits a control command converted into the data of the second protocol to the second device. On the contrary, each device transmits response data to the control command to the first device communication unit or second device communication unit. The response data transmitted by the first device is transmitted as it is to the first central control server by the first server communication unit 111. On the contrary, the response data transmitted by the second device is converted into the data of the first protocol by the second data conversion unit 122 and then transmitted to the first central control server.

Operation information, status information and the like, received from the first device or second device are also subject to similar operations and then transmitted to the first central control server or second central control server. For example, the second device communication unit 123 receives data from the second device, and the second data conversion unit determines whether the destination of the data is a first central control server or second central control server. In other words, the second data conversion unit determines whether they are data that should be processed by the first central control software or data that should be processed by the second central control software. When they are information that should be processed by the first central control server, the second data conversion unit converts various information into the data of the first protocol. The first server communication unit or second server communication unit transmits various information to the first central control server or second central control server which is the destination of each server communication unit.

Figure 4:
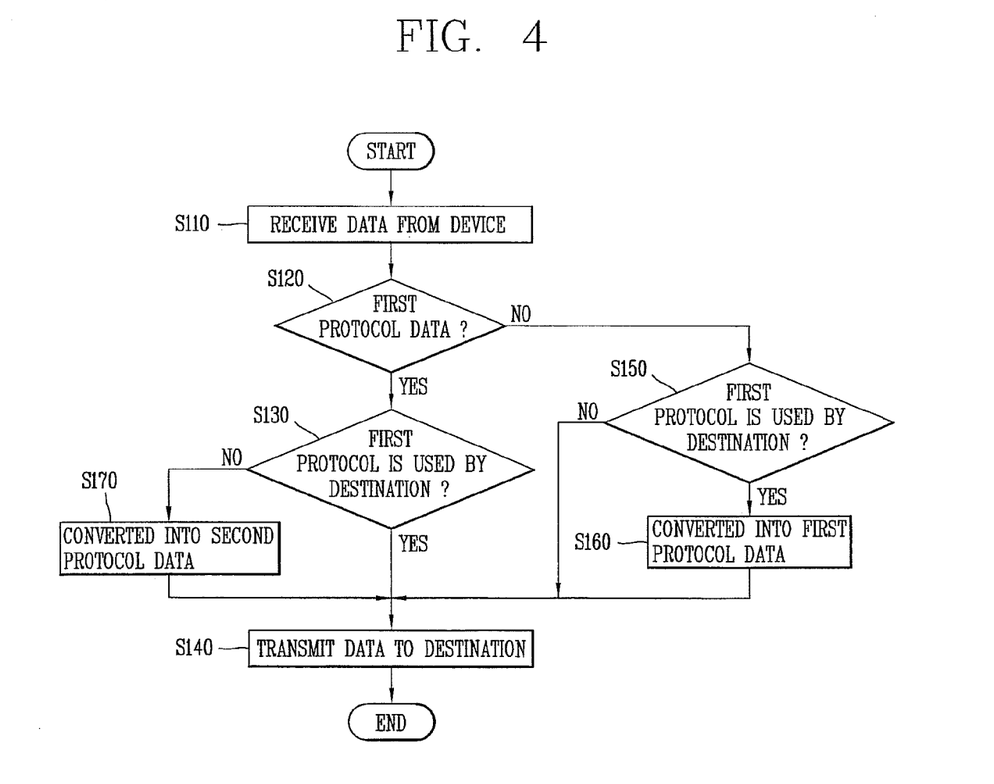
FIGS. 4 and 5 are flow charts schematically illustrating a method of operating a building automation and control system according to the embodiments of the present disclosure.

FIG. 4 is a flow chart illustrating a method of operating a building automation and control system according an embodiment of the present disclosure. Here, the system may include a building controller connected to devices within a building configured with a plurality of sub-nets using different protocols, respectively, to transmit and receive data and control devices forming the sub-net based on the data.

Referring to FIG. 4, in a method of operating a building automation and control system for automating and controlling the building using the building controller, a method of operating a building automation and control system according to an embodiment may include a data receiving step (S110) of receiving the data from the device, a first determination step (S120) of determining whether or not the data is first protocol data, a second determination step (S130, S150) of determining whether or not the destination of the data uses the first protocol, and a data transmission step (S140, S160, S170) of transmitting the data to the destination according to a determination result of the first and the second determination step. Hereinafter, the configuration of the device refers to FIGS. 1 and 3.

Subsequent to receiving data from devices (S110), the building controller determines which protocol is used by a device that has transmitted the relevant data (S120) and which protocol is used by a device that will transmit the relevant data (S130, S150). In other words, the building controller determines whether data that has been received from the device is first protocol data or second protocol data (S120). Of course, the building controller can recognize whether it is data transmitted from the first device or data transmitted from the second device based on the connection status, and thus immediately determine which protocol is used therein. Then, the building controller determines which protocol is used by the destination of the relevant data (S130, S150).

When the data received by the building controller is the first protocol data, and the destination uses the first protocol, the building controller transmits the data to the destination without protocol conversion (S140). When the received data is the first protocol data, and the destination uses the second protocol (NO in S130), the building controller converts the data into second protocol data (S170) and transmits the converted second protocol data to the destination (S140). On the contrary, when the received data is the second protocol data (NO in S120), and the destination uses the first protocol (YES in S150), the building controller converts the data into first protocol data (S160) and transmits the converted first protocol data to the destination (S140). When the received data is the second protocol data, and the destination uses the second protocol, the building controller transmits the data to the destination without protocol conversion (S140). The building controller may receive the data as the need arises, and then process the received data and then transmit the processed data to the destination. Here, the destination may be devices in another sub-net, or a central control server connected to the building controller.

Figure 5:
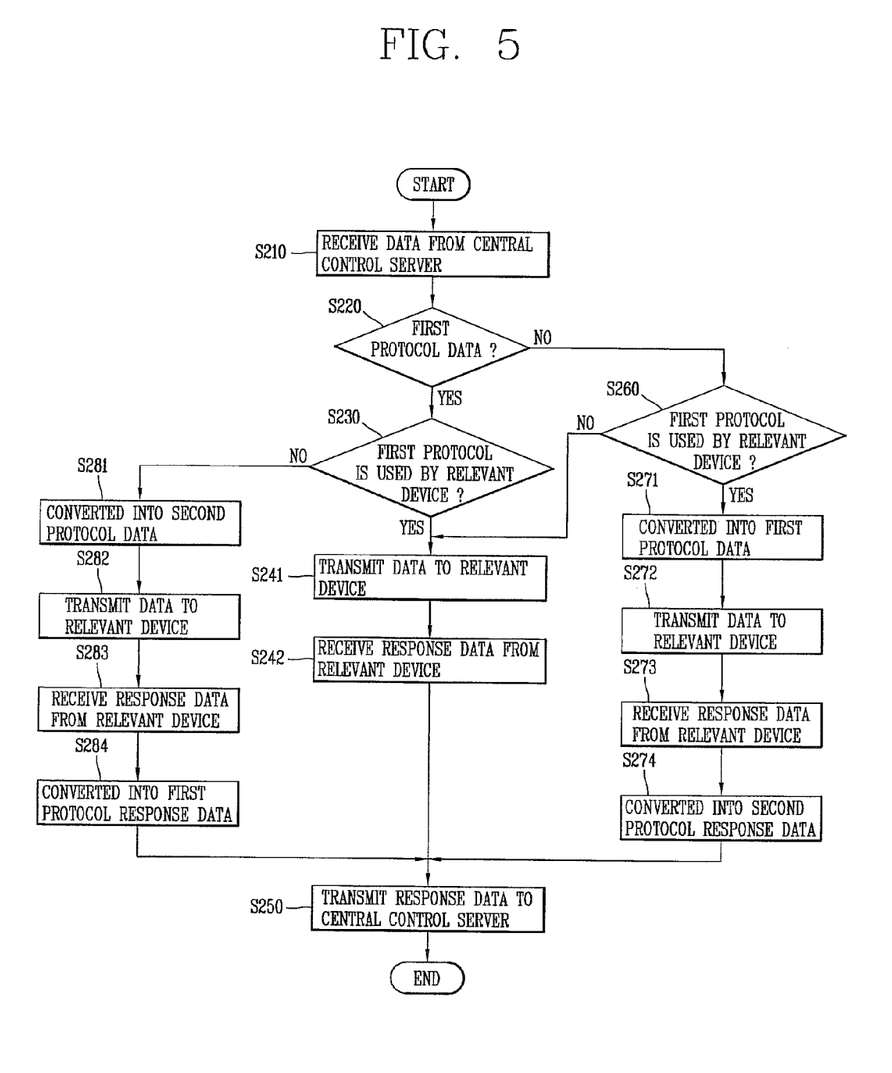

FIG. 5 is a flow chart illustrating a method of operating a building automation and control system according another embodiment of the present disclosure. Here, the system may include a building controller connected to devices within a building configured with a plurality of sub-nets using a different protocols, respectively, to transmit and receive data and control devices forming the sub-net based on the data and a central control server connected to the building controller.

Referring to FIG. 5, in a method of operating a building automation and control system for automating and controlling the building using the building controller, a method of operating a building automation and control system according to an embodiment may include a data receiving step (S210) of receiving the data from the central control server, a first determination step (S220) of determining whether or not the data is first protocol data, a second determination step (S230, S260) of determining a protocol of the relevant device subject to the data, a data transmission step (S241, S272, S282) of transmitting the data to the relevant device according to a determination result of the first and second determination step, a step (S242, S273, S283) of receiving response data from the relevant device, a third determination step of determining a protocol of the central control server, and a response data transmission step (S250) of transmitting the response data to the central control server according to a determination result of the third determination step. Hereinafter, the configuration of the device refers to FIGS. 2 and 3.

Upon receiving data from a central control server or devices (S210), the building controller determines which protocol is used by a device that has transmitted the relevant data (S220) and which protocol is used by a device that will transmit the relevant data (S230, S260). In other words, the building controller determines whether data that has been received from the central control server or device is first protocol data or second protocol data. Then, the building controller determines which protocol is used by the destination of the relevant data. Here, the data transmitted by the central control server may further include various commands, and the data transmitted by the device may further include response data.

When the data received by the building controller from the central control server, namely, command, is the first protocol data, and a device corresponding to the destination uses a first device using the first protocol (YES in S230), the building controller transmits the data to the first device without protocol conversion (S241). When the received command is the first protocol data transmitted by the first central control server, and the relevant device uses the second protocol as a second device (NO in S230), the building controller converts the data into second protocol data (S281) and transmits the converted second protocol data to the second device (S282). On the contrary, when the received command is the second protocol data transmitted by the second central control server (NO in S220), and the destination is a first device using the first protocol (YES in S260), the building controller converts the data into first protocol data (S271) and transmits the converted first protocol data to the first device (S272). When the received data is the second protocol data, and the destination is a second device using the second protocol (NO in S260), the building controller transmits the data to the second device without protocol conversion (S241). The building controller may receive the command as the need arises, and then process the received data and then transmit the processed data to the relevant device. On the contrary, the building controller may receive response data to the relevant command from the relevant devices (S242, S273, S283), and perform protocol conversion or transmit the data as it is to the central control server (S250).

Operation information, status information and the like, received from the first device or second device are also subject to similar operations and then transmitted to the first central control server or second central control server. For example, the building controller receives data from the second device, and determines whether the destination of the data is a first central control server or second central control server. In other words, the building controller determines whether they are data that should be processed by the first central control software or data that should be processed by the second central control software. When they are information that should be processed by the first central control server, the building controller converts various information into the data of the first protocol, and transmits the converted data to the first central control server. On the contrary, when they are information that should be processed by the second central control server, the building controller transmits various information as they are to the second central control server.

As described above, in a building automation and control system and a method for operating the same according to the embodiments of the present disclosure, the building controller may process data using a plurality of protocols without using a BACnet gateway, thereby controlling devices in a building coexisting with two or more protocols. According to the embodiments of the present disclosure, sub-systems having different their own protocols, respectively, may be integrated to establish a building automation and control system, and data may be processed using a single building controller, thereby enhancing the scalability and stability of the system.

What is claimed is:

1. A building automation and control system for automating and controlling a building configured with one or more sub-nets, the system comprising:
a building controller configured to control devices installed in a building to form the sub-net;
a first device connected to the building controller using a first protocol to transmit and receive first data; and
a second device connected to the building controller using a second protocol to transmit and receive second data, wherein the building controller includes:
a first module that processes the first data using the first protocol, or converts the first data into a data of the second protocol, and
a second module that processes the second data using the second protocol, or converts the second data into a data of the first protocol, wherein the building controller is configured to:
determine which protocol is used by a destination of the first data and/or the second data;
convert the first data into the data of the second protocol when the destination of the first data is determined to be the second protocol;
convert the second data into the data of the first protocol when the destination of the second data is determined to be the first protocol; and
transmit the first data and/or the second data to the destination of the first data and/or the second data respectively; wherein the building controller is directly connected to the first and second devices without a gateway.

2. The system of claim 1, further including:
a first central control server connected to the building controller using the first protocol to control a sub-net installed with the first device based on the first data.

3. The system of claim 2, further including:
a second central control server connected to the building controller using the second protocol to control a sub-net installed with the second device based on the second data.

4. The system of claim 2, wherein the first module includes:
a first server communication unit configured to transmit and receive the first data to and from the first central control server;
a first data conversion unit configured to convert the first data into the data of the second protocol; and
a first device communication unit configured to transmit and receive the first data to and from the first device.

5. The system of claim 4, wherein the second module includes:
a second server communication unit configured to transmit and receive the second data to and from the second central control server;
a second data conversion unit configured to convert the second data into the data of the first protocol; and
a second device communication unit configured to transmit and receive the second data to and from the second device.

6. The system of claim 5, wherein the first and second module, respectively, include:
a first and a second storage unit configured to store the monitoring and control points of devices forming the sub-net into a database.

7. The system of claim 6, wherein the first protocol is a BACnet protocol.

8. The system of claim 7, wherein the second protocol is one of TCP, UDP, serial and parallel, or one of open communication protocols excluding the BACnet.

9. The system of claim 1, wherein the sub-net is formed in one or more sub-systems including heating and cooling, ventilation, lighting, disaster prevention, security, and access control.

10. A method of operating a building automation and control system including a building controller connected to devices within a building configured with a plurality of sub-nets using a first protocol or a second protocol to transmit and receive data and control devices forming the sub-net based on the data, and configured to automate and control the building using the building controller, the method comprising
receiving the data from the device;
determining whether or not the data is first protocol data;
determining whether or not the destination of the data uses the first protocol;

transmitting the data to the destination according to a determination result of the first and the second determinations;

transmitting the data to the destination without protocol conversion when the data is the first protocol data, and the destination uses the first protocol;

converting the data into second protocol data and transmitting the converted second protocol data to the destination when the data is the first protocol data, and the destination uses the second protocol;

converting the data into first protocol data and transmitting the converted first protocol data to the destination when the data is the second protocol data, and the destination uses the first protocol; and transmitting the data to the destination without protocol conversion when the data is the second protocol data, and the destination uses the second protocol, wherein the building controller is directly connected to the first and second device without a gateway.

11. A method of operating a building automation and control system including a building controller connected to devices within a building configured with a plurality of sub-nets using a first protocol or a second protocol to transmit and receive data and control devices forming the sub-net based on the data and a central control server connected to the building controller, and configured to automate and control the building using the building controller, the method comprising:

receiving the data from the central control server;
determining whether or not the data is first protocol data;
determining a protocol of the relevant device subject to the data;
transmitting the data to the relevant device according to a determination result of the first and second determinations;
receiving response data from the relevant device;
determining a protocol of the central control server; and
transmitting the response data to the central control server according to a determination result of the protocol of the central control server, wherein the building controller is directly connected to the first and second device without a gateway, wherein the building controller includes:

a first module that processes the first data using the first protocol, or converts the first data into a data of the second protocol; and a second module that processes the second data using the second protocol, or converts the second data into a data of the first protocol, wherein the building controller is configured to:

determine which protocol is used by a destination of the first data and/or the second data;

convert the first data into the data of the second protocol when the destination of the first data is determined as the second protocol;

convert the second data into the data of the first protocol when the destination of the second data is determined as the first protocol; and transmit the first data and/or the second data to the a destination of the first data and/or the second data respectively;

wherein the building controller is directly connected to the first and second devices without a gateway.

12. The system of claim 1, wherein each of the first device and the second device is one of an air conditioner, an air handling device, a fan, a boiler, a cooling tower, a pump, a freezer, a lighting device, a power device, a fire device, a disaster prevention device, a security device, or an access control device.

* * * * *